Figure 1:
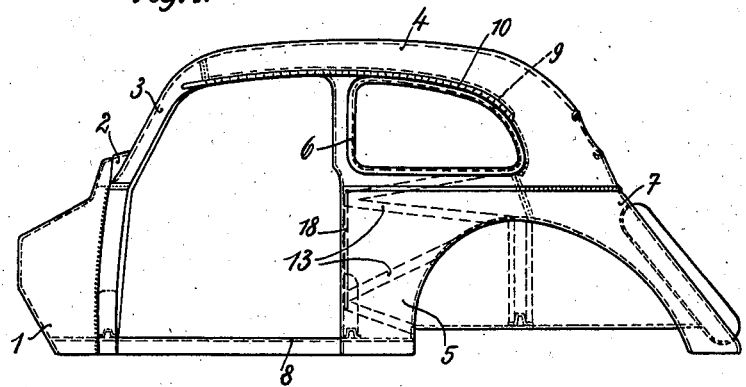

Aug. 15, 1939.   H. R. BERNDT ET AL   2,169,788
VEHICLE BODY
Filed March 6, 1937

Inventor:
Hans Rolf Berndt
Reinhold Erhard Conrad

Patented Aug. 15, 1939

2,169,788

UNITED STATES PATENT OFFICE 2,169,788

VEHICLE BODY

Hans Rolf Berndt, Chemnitz, and Reinhold Erhard Conrad Schulz, Berlin-Spandau, Germany, assignors to Auto Union Aktiengesellschaft, Chemnitz, Germany Application March 6, 1937, Serial No. 129,456
In Germany March 7, 1936

6 Claims. (Cl. 296—31)

It is known to use artificial materials for constructing bodies for vehicles, and attempts have been made to form the outer shell of the body from a plurality of thin layers which are successively sprayed on to the moulds used for manufacturing the shell and then hardened.

It has further been proposed to construct the vehicle bodies from layers of fabric impregnated with artificial resin, which are secured over a mould block, it being possible to stretch between the fabric layers a wire fabric which is stuck to the other layers. Such structures, on account of the non-uniformity in the distribution and in the quality of the materials arising during the manufacture, not only have small strength but also the manufacture is very uneconomical on account of the large number of separate operations.

Artificial resins are also commonly used in automobile construction where only small stresses occur and it is desired to avoid subsequent working. Thus switch-boards, window frames and the like are frequently made of artificial resins.

The invention provides an improved method of making vehicle bodies and other automobile parts, using artificial resin or similar substances, and the novelty consists in this, that substantial, more particularly highly stressed parts such as, for example, side parts, rear parts, and the like, are pressed in the desired shape from laminated artificial resin material, more particularly layers of paper impregnated with artificial resin. In this way the construction of the vehicle body is made very simple, since the individual parts can be made in large numbers, after having once constructed the pressing dies and plungers, without any subsequent working being necessary.

The artificial resin material which is used (for example, paper impregnated with artificial resin and arranged in layers) gives a high strength to the part, which is greater than that of the ordinary plywood; also, as compared with sheet metal, the local strength is considerably higher. The whole vehicle body is very weather-proof, since the rotting which occurs after a long time with plywood is completely avoided.

As a further valuable development it is provided, according to the invention, that all the parts should be made with high mechanical strength, for example by pressing in or application of profiles, so that when the parts are secured together a self-supporting vehicle body is obtained. In this way the whole construction is lighter than any of the hitherto known constructions, so that a more favourable position of the centre of gravity of the vehicle is obtained together with good road position and good running properties. Advantageously, the individual parts can be strengthened in the high stressed zones by ribs or, for example, a number of superposed strips of the same material. This makes it possible for all the parts which only need to have local strength to be made very thin and therefore light, while the reinforcements are provided along the lines of force of the higher stresses in the material.

Advantageously, the re-inforcing layers are combined with the other material in the pressing operation in the manner of a welding, if necessary using heat and with addition of artificial resin binding agents and irregularly distributed filling substances so that it is impossible for these re-inforcements to become loose or to peel off.

According to the invention furthermore, all the edges of the parts to be combined are reinforced, so that for connecting them with the adjoining parts screw bolts or ordinary steel screws can be used. In this way it becomes possible to interchange all the parts very simply so that parts damaged by undue stress, more particularly by collisions, can be removed by simply loosening the screws. The vehicle body will be ready for use again after a replacement part has been inserted.

Further valuable features of the invention are more fully described below and relate to the construction of the floor of the vehicle and its reinforcement.

The accompanying drawing illustrates a constructional example of the invention.

Figure 2:
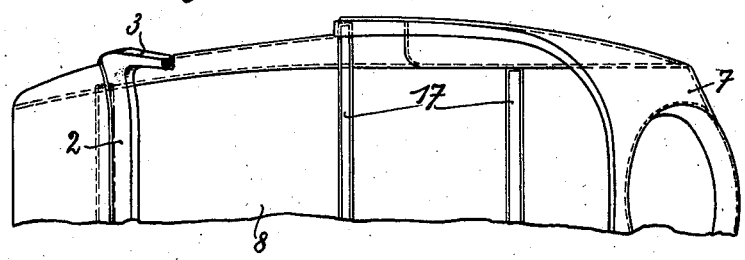
Figure 4:
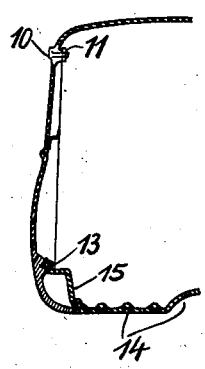
Figure 3:
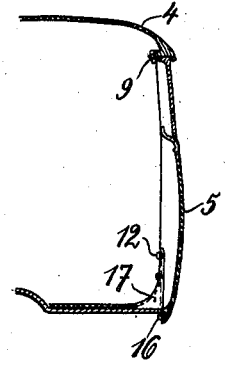

Fig. 1 is a side elevation of an automobile body constructed according to the new method, Fig. 2 is a plan of the vehicle body, Fig. 3 is a section on the line I—I of Fig. 1, Fig. 4 is a section on the line I—I of Fig. 1 with a modified form of floor.

According to Figs. 1-4 the parts from which the new vehicle body is constructed are two cowl side parts 1, a cowl upper part 2 with wind screen frame 3, a roof 4, two rear body parts 5 made in one piece with arms for side windows 6, a rear part 7 and a floor 8. All the parts are made with re-inforced edges 9, which, as shown at 10, may cover the joints between adjacent parts. The individual parts are connected with the adjoining edges by screw bolts 11. When two parts lie flat one upon another, steel screws 12 may preferably be provided.

The walls of the individual parts are comparatively thin and only made so strong that the local strength is sufficient for the usual shocks or stresses. The zones subjected to greater stresses are re-inforced by means of applied strips, as shown for example, at 13. In the example illustrated they serve for taking up and transmitting over the whole wall the high stresses arising at the door hinges. Such re-inforcements are preferably provided wherever high stresses occur, for example in the roof at the rear part and at the side parts. The floor is preferably re-inforced by means of special pressed in profiles as shown at 14 (Fig. 4) or by lateral box-shaped pressed-out parts 15, so that, when the floor is screwed together with the other parts, a completely self-supporting vehicle body is obtained.

In constructing the vehicle body for use on chassis the floor is made flat, as shown in Fig. 3, and is secured to the side parts by steel screws at edges 16. Additional stirrups 17 of artificial resin material or metal, which are secured on to the adjoining parts, serve as additional re-inforcement.

As constructional material any artificial resins can be used which have a bending strength of about 1500 kg/cm.$^2$ and a notch shock strength of about 25 cm. kg/cm.$^2$. At particularly highly stressed places also metal insertions can be pressed into the artificial resin, as shown at 18 The securing members for the other parts are secured thereto.

The individual parts are effected by means of steel dies and press plungers with the necessary pressures and temperatures.

What we claim is:

1. The method of making vehicle bodies from artificial resin which comprises, forming substantial panel parts for the body of laminations of artificial resin and continuous paper webs impregnated with artificial resin, pressing said layers into the desired shapes to form composite compact panels, curing the resin while the layers of the panels are compact to homogeneously unite the paper webs, and thereafter securing said parts together to form the finished vehicle body.

2. A method of making vehicle bodies which comprises, shaping continuous paper sheets impregnated with artificial resin so as to provide a general outline of substantial panel parts for the vehicle body, superimposing said sheets on each other, applying pressure to the faces of said sheets to form compact panel parts of the desired shape and contour, curing the resin while pressure is applied to the sheets, and detachably securing the panel parts together to form a vehicle body.

3. In a method of making vehicle bodies which consists in, impregnating paper with artificial resin, cutting the impregnated paper into continuous sheets to outline the panel parts of the vehicle body, superimposing the impregnated sheets on each other, applying pressure to the faces of the superimposed sheets to compact the paper and resin and mold the same to the desired shape, curing the resin while pressure is applied to the sheets to homogeneously unite the paper sheets in laminar form and provide relatively thin yieldable panel parts.

4. In a method of making vehicle bodies which consists in, cutting paper sheets impregnated with artificial resin to form the general outline of substantially panel parts for the vehicle body, superimposing said sheets on each other, arranging superimposed strips of paper impregnated with artificial resin along those face portions of the sheets which are to be subjected to the highest stresses, applying pressure to the faces of the sheets and the strips to compact the same and mold the panel parts to the desired shape, and curing the resin while pressure is applied to the sheets and the strips to homogeneously unite the same.

5. In a method of making vehicle bodies which consists in, cutting paper sheets impregnated with artificial resin to provide a general outline of substantial panel parts for the vehicle body, superimposing said sheets on each other, arranging superimposed strips of paper impregnated with artificial resin along the edges of the sheets, applying pressure to the faces of the sheets and the strips to compact the same and shape the panel parts to the desired contour, and curing the resin while pressure is applied to the sheets and the strips to homogeneously unite the same, whereby said strips reinforce the panel parts and provide means for securing one panel to another.

6. In a method of making a vehicle body which consists in, cutting paper sheets impregnated with artificial resin into such shape as to outline the floor portion of the body, superimposing said sheets on each other, arranging superimposed strips of paper impregnated with artificial resin along a face of said sheets at spaced intervals, applying pressure to the faces of the sheets and the strips to compact the same and mold the sheets to the desired floor shape, and curing the resin while pressure is applied to the sheets and the strips to unite the same and form a relatively thin yieldable floor portion of the body having integral reinforcing strips.

HANS ROLF BERNDT.
REINHOLD ERHARD CONRAD SCHULZ.